United States Patent
Ladd

(10) Patent No.: US 7,851,798 B2
(45) Date of Patent: Dec. 14, 2010

(54) METHOD AND APPARATUS FOR DARK CURRENT AND BLOOMING SUPPRESSION IN 4T CMOS IMAGER PIXEL

(75) Inventor: John Ladd, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 428 days.

(21) Appl. No.: 11/121,119

(22) Filed: May 4, 2005

(65) Prior Publication Data
US 2006/0249731 A1  Nov. 9, 2006

(51) Int. Cl.
*H01L 29/04* (2006.01)
(52) U.S. Cl. .......................... 257/59; 257/233; 257/431; 257/466; 257/184; 257/292; 257/187; 257/E21.185; 257/E21.189; 257/E21.456; 257/E21.458; 257/219; 257/225; 257/239
(58) Field of Classification Search .................. 257/59, 257/233, 431–466, 184, 187, 292, E21.644, 257/E21.185, E21.189, E21.456, E21.458, 257/219, 225, 239
See application file for complete search history.

(56) References Cited

U.S. PATENT DOCUMENTS

| | | | | |
|---|---|---|---|---|
| 3,856,989 A | * | 12/1974 | Weimer | 348/318 |
| 4,926,225 A | * | 5/1990 | Hosack | 257/225 |
| 5,637,922 A | * | 6/1997 | Fillion et al. | 257/728 |
| 6,140,630 A | | 10/2000 | Rhodes | |
| 6,177,333 B1 | | 1/2001 | Rhodes | |
| 6,204,524 B1 | | 3/2001 | Rhodes | |
| 6,310,366 B1 | * | 10/2001 | Rhodes et al. | 257/185 |
| 6,326,652 B1 | | 12/2001 | Rhodes | |
| 6,333,205 B1 | | 12/2001 | Rhodes | |
| 7,099,056 B1 | * | 8/2006 | Kindt | 358/509 |
| 7,196,436 B2 | * | 3/2007 | Kugelman | 307/141.8 |
| 2002/0145669 A1 | * | 10/2002 | Umeda et al. | 348/220.1 |
| 2002/0163584 A1 | | 11/2002 | Kokubun et al. | |
| 2002/0167031 A1 | * | 11/2002 | Francois | 257/293 |

FOREIGN PATENT DOCUMENTS

EP  1 223 623 A2  7/2002

OTHER PUBLICATIONS

Mendis, et al., "CMOS Active Pixel Image Sensor", IEEE Transactions on Electron Devices, vol. 41, No. 3, Mar. 1994, pp. 452-453.
Nixon et al., "256×256 CMOS Active Pixel Sensor Camera-on-a-Chip", IEEE Journal of Solid-State Circuits, vol. 31, No. 12, Dec. 1996, pp. 2046-2050.

* cited by examiner

*Primary Examiner*—Wael M Fahmy
*Assistant Examiner*—Marc Armand
(74) *Attorney, Agent, or Firm*—Dickstein Shapiro LLP

(57) ABSTRACT

A method and apparatus for operating an imager pixel that includes the act of applying a relatively small first polarity voltage and a plurality of pulses of a second polarity voltage on the gate of a transfer transistor during a charge integration period.

27 Claims, 8 Drawing Sheets

METHOD AND APPARATUS FOR DARK CURRENT AND BLOOMING SUPPRESSION IN 4T CMOS IMAGER PIXEL

FIELD OF THE INVENTION

The present invention relates generally to semiconductor devices, and more particularly, to dark current and blooming suppression in imager pixels.

BACKGROUND OF THE INVENTION

CMOS image sensors are increasingly being used as relatively low cost imaging devices. A CMOS image sensor circuit includes a focal plane array of pixel cells, each one of the cells includes a photo-conversion device, such as e.g., a photogate, photoconductor, or photodiode having an associated charge accumulation region within a substrate for accumulating photo-generated charge. Each pixel cell may include a transistor for transferring charge from the charge accumulation region to a sensing node, and a transistor for resetting the sensing node to a predetermined charge level prior to charge transference. The pixel cell may also include a source follower transistor for receiving and amplifying charge from the sensing node and an access transistor, for controlling the readout of the cell contents from the source follower transistor.

In a CMOS image sensor, the active elements of a pixel cell perform the necessary functions of: (1) photon to charge conversion; (2) accumulation of image charge; (3) transfer of charge to the sensing node; (4) resetting the sensing node to a known state; (5) selection of a pixel for readout; and (6) output and amplification of a signal representing pixel charge from the sensing node.

CMOS image sensors of the type discussed above are generally known as discussed, for example, in Nixon et al., "256×256 CMOS Active Pixel Sensor Camera-on-a-Chip," IEEE Journal of Solid-State Circuits, Vol. 31(12), pp. 2046-2050 (1996); and Mendis et al., "CMOS Active Pixel Image Sensors," IEEE Transactions on Electron Devices, Vol. 41(3), pp. 452-453 (1994). See also U.S. Pat. Nos. 6,140,630, 6,177,333, 6,204,524, 6,310,366, 6,326,652, and 6,333,205, assigned to Micron Technology, Inc., the contents of which are incorporated herein by reference.

A typical four transistor (4T) CMOS imager pixel 150 is shown in FIG. 1A. The pixel 150 includes a photo-conversion device 100, which may be implemented as a pinned photodiode, transfer transistor 110, floating diffusion region FD, reset transistor 120, source follower transistor 130 and row select transistor 180. The photo-conversion device 100 is connected to the floating diffusion region FD by the transfer transistor 110 when the transfer transistor 110 is activated by a transfer gate control signal TX.

The reset transistor 120 is connected between the floating diffusion region FD and a pixel supply voltage Vpix. A reset control signal RST is used to activate the reset transistor 120, which resets the floating diffusion region FD to the pixel supply voltage Vpix level as is known in the art.

The source follower transistor 130 has its gate connected to the floating diffusion region FD and is connected between an array supply voltage Vaa and the row select transistor 180. The source follower transistor 130 converts the charge stored at the floating diffusion region FD into an electrical output voltage signal PIX OUT. The row select transistor is controllable by a row select signal SEL for selectively connecting the source follower transistor 130 and its output voltage signal PIX OUT to a column line 190 of a pixel array.

FIG. 1B illustrates a simplified timing diagram for the readout and photo-charge integration operations for the pixel 150 illustrated in FIG. 1A. FIG. 1B illustrates a first readout period 181 in which previously stored photo-charges are readout of the pixel 150. During this first readout period 181, the reset control signal RST is pulsed to activate the reset transistor 120, which resets the floating diffusion region FD to the pixel supply voltage Vpix level. While the SEL signal is high, a sample and hold reset signal SHR is pulsed to store a reset signal Vrst (corresponding to the reset floating diffusion region FD) on a sample and hold capacitor of a sample and hold circuit (not shown in FIG. 1A or 1B). The transfer control signal TX is then activated to allow photo-charges from the photo-conversion device 100 to be transferred to the floating diffusion region FD. While the SEL signal remains high, a sample and hold pixel signal SHS is pulsed to store a pixel signal Vsig from the pixel 150 on another sample and hold capacitor of the sample and hold circuit.

During the integration period 191, the reset control signal RST, transfer control signal TX and sample and hold signals SHR, SHS are set to a ground potential GRND. It is during the integration period 191 that the photo-conversion device accumulates photo-charge based on the light incident on the photo-conversion device. After the integration period 191, a second readout period 171 begins. During the second readout period 171, the photo-charges accumulated in the integration period 191 are readout of the pixel 150 (as described above for period 181).

One common problem associated with conventional imager pixel cells, such as pixel cell 150, is dark current, that is, current generated as a photo-conversion device signal in the absence of light. As shown in the potential diagram of FIG. 1C, dark current 161 may be caused by many different factors, including: photosensor junction leakage, leakage along isolation edges, transistor sub-threshold leakage, drain induced barrier lower leakage, gate induced drain leakage, trap assisted tunneling, and pixel fabrication defects. One example of a defect is an interstitial vacancy state in the charge carrier-depletion region. This defect causes increased thermal generation of electron-hole pairs, which may be collected in the photo-conversion device 100 (FIG. 1A) and effectively lower overall image quality.

Accordingly, a pixel having a decreased dark current without negative blooming effects is desired. Also needed is a simple method of fabricating and operating such a pixel.

BRIEF SUMMARY OF THE INVENTION

The invention provides a method of operating an imager pixel such that dark current and the factors that cause dark current in imagers are reduced. The invention permits a reduction in dark current without a reduction in pixel capacity and without causing blooming.

The above and other features and advantages are achieved in an exemplary embodiment of the invention by a method of operating an imager pixel that includes the act of applying a relatively small first voltage and a plurality of pulses of a second voltage on the gate of a transfer transistor during a charge integration period. The first voltage being a small negative voltage and the second voltage being a small positive voltage. When a small negative voltage is applied to the transfer gate, electrons that would normally create dark current problems will instead recombine with holes thereby substantially reducing dark current. When the small positive voltage pulses are applied, a depletion region is created under the transfer transistor gate, which creates a path for dark current electrons to be transferred to a pixel floating diffusion region.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

Figure 1A:
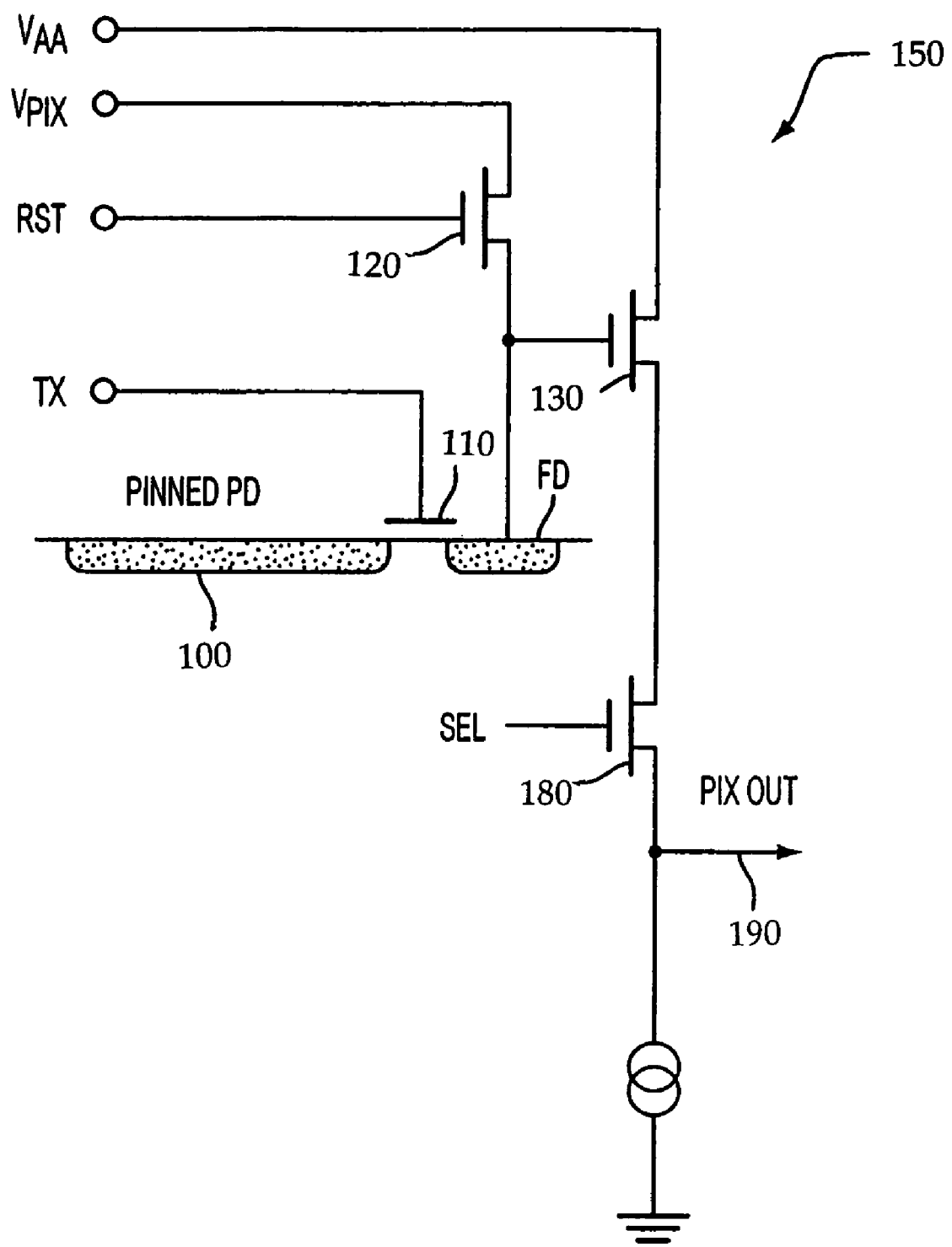
FIG. 1A illustrates a conventional four transistor (4T) pixel cell circuit.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice the invention, and it is to be understood that other embodiments may be utilized, and that structural, logical and electrical changes may be made without departing from the spirit and scope of the present invention.

The terms "wafer" and "substrate" are to be understood as including silicon, silicon-on-insulator (SOI), silicon-on-sapphire (SOS), and silicon-on-nothing (SON) technology, doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions or junctions in the base semiconductor structure or foundation. In addition, the semiconductor need not be silicon-based, but could be based on silicon-germanium, germanium, or gallium-arsenide.

The term "pixel" or "pixel cell" refers to a picture element unit cell containing a photo-conversion device and active devices such as transistors for converting electromagnetic radiation to an electrical signal. For purposes of illustration, a portion of a representative pixel cell is illustrated in the figures and description herein, and typically fabrication of all pixel cells in an image sensor will proceed concurrently and in a similar fashion.

One possible solution to reducing the dark current generation underneath the transfer transistor gatestack is to apply a negative voltage on the transfer transistor's gate. The negative voltage attracts electron-hole pairs to the surface, decreasing the depletion region there and effectively covering the interstitial vacancy state. Accordingly, with a negative voltage applied to the transfer transistor gate, thermally generated electron-hole pairs will likely recombine before the photo-conversion device can collect them. This solution, however, tends to aggravate another problem, referred to as blooming. Blooming occurs when the storage capacity of the photo-conversion device is full and electrons are still being generated even though the photo-conversion device is full. The extra electrons can bloom to several locations. The extra electrons may attempt to diffuse by jumping across isolation barriers into adjacent pixels, corrupting their signals. Alternatively, the electrons may travel through the substrate and be collected in other areas of the pixel or in periphery circuit devices. The floating diffusion region is the intended and most desirable place for the extra electrons to be collected. The floating diffusion region has considerable capacity to store these stray electrons during imager operation and the signal on the floating diffusion region is cleared or reset before the pixel signal is actually read.

Positively biasing the transfer transistor gate makes extra electrons more likely to bloom through the transfer transistor to the floating diffusion region. However, applying a negative bias to the transfer transistor gate, which is desirable to prevent dark current penetration, makes it more difficult for the extra electrons to bloom to the floating diffusion region, thus causing blooming into other undesirable regions of a pixel or adjacent pixels. Moreover, as suggested above, a positively biased transfer transistor gate increases the dark current as a result of a larger depletion region under the transfer transistor gate.

The inventor has determined that the accumulation of dark charges from dark current generated underneath a transfer transistor can be substantially reduced by applying a relatively small negative voltage to the gate of the transfer transistor during an integration period followed by also applying positive voltage pulses to the gate of the transfer transistor during the same integration period.

Figure 1B:
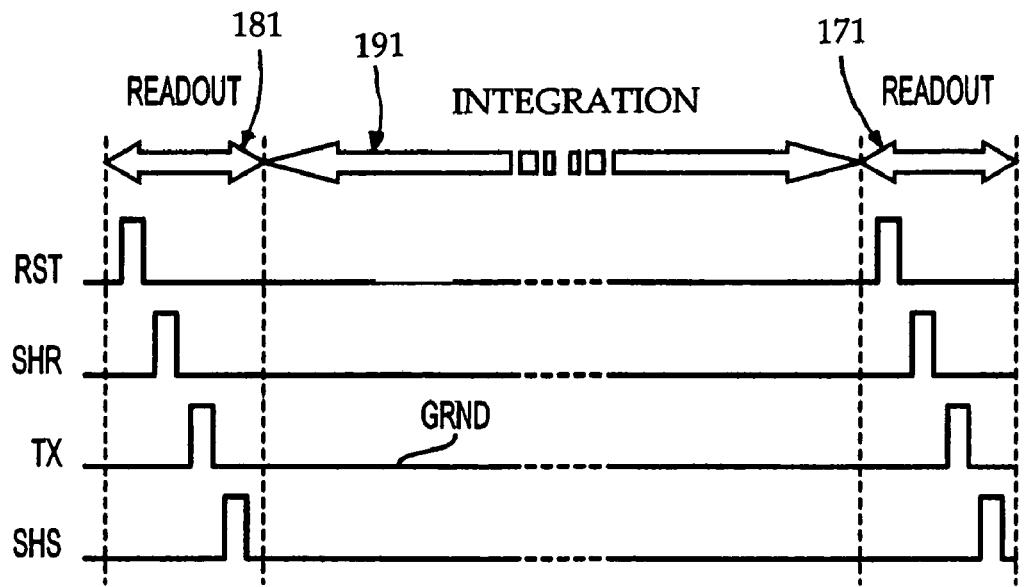
FIG. 1B illustrates a timing diagram for operating the pixel circuit of FIG. 1A in a conventional manner.
Figure 2:
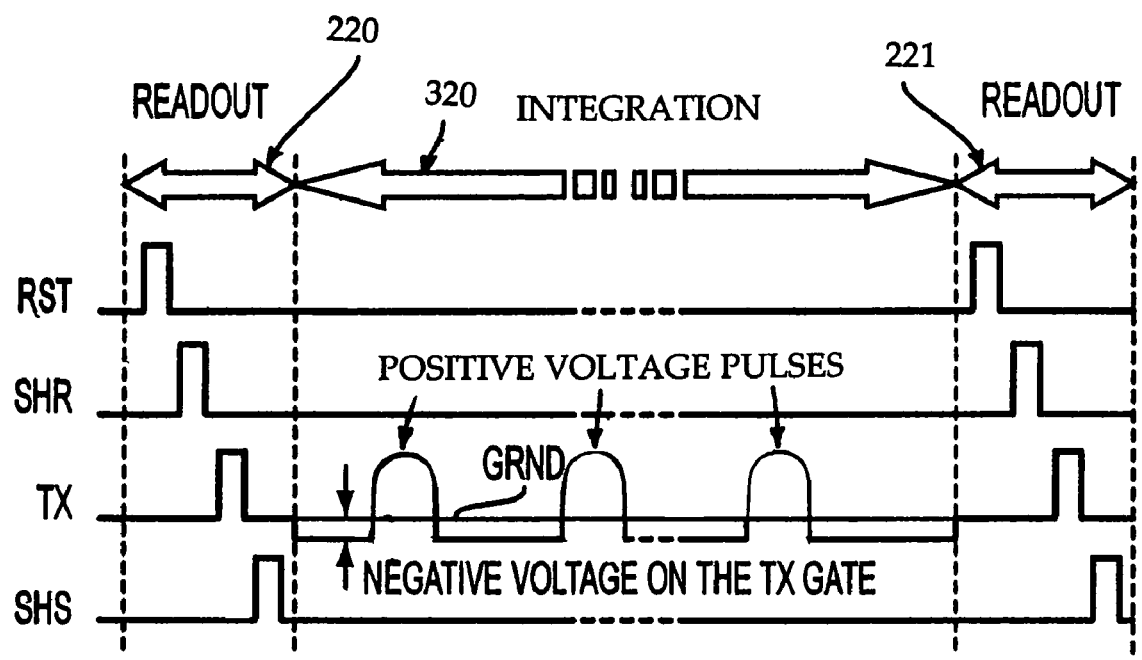
FIG. 2 illustrates a timing diagram for operating the pixel circuit of FIG. 1A in accordance with an exemplary embodiment of the invention.

FIG. 2 illustrates a timing diagram for operating the pixel circuit of FIG. 1A in accordance with an exemplary embodiment of the invention. FIG. 2 illustrates two readout periods 220, 221 and an integration period 320. The two readout periods are the same as the conventional readout periods described above in respect to FIG. 1B. That is, during this first readout period 220, for example, the reset control signal RST is pulsed to activate the reset transistor, which resets the floating diffusion region FD to the pixel supply voltage Vpix level. While the SEL signal is high, a sample and hold reset signal SHR is pulsed to store a reset signal Vrst (corresponding to the reset floating diffusion region FD) on a sample and hold capacitor of a sample and hold circuit (such as sample and hold circuit 761 of FIG. 7). The transfer control signal TX is activated to allow photo-charges from the photo-conversion device 100 to be transferred to the floating diffusion region FD. While the SEL signal is still high, a sample and hold pixel signal SHS is pulsed to store a pixel signal Vsig from the pixel on another sample and hold capacitor in the sample and hold circuit.

Figure 3A:
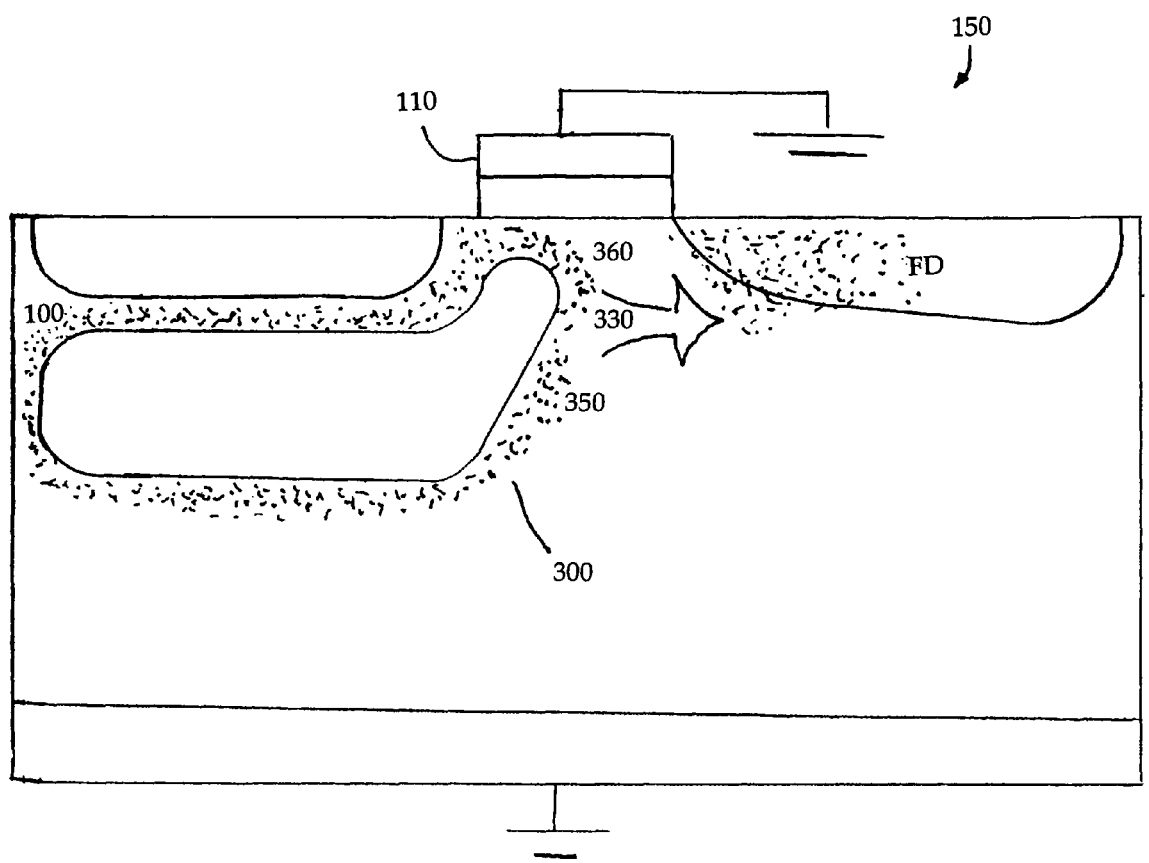
FIG. 3A illustrates a cross-sectional view of the pixel cell of FIG. 1A when operated in accordance with the FIG. 2 timing diagram.
Figure 3B:
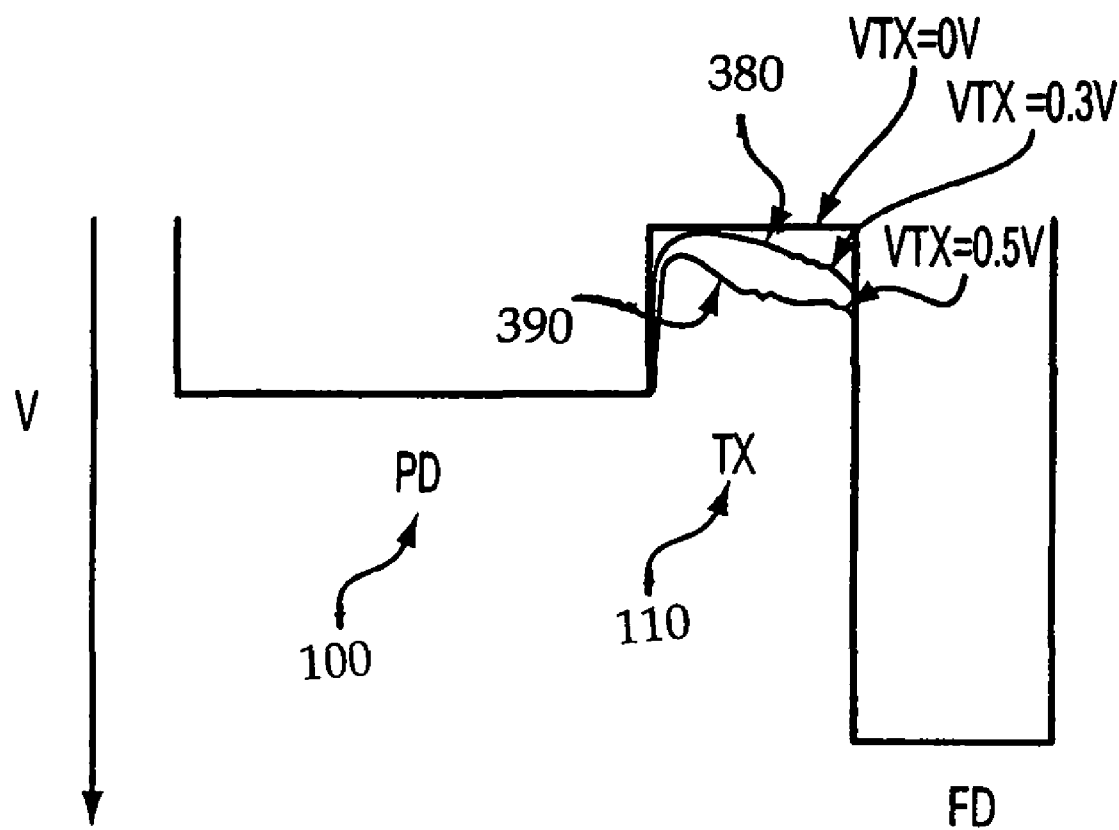
FIG. 3B illustrates a voltage potential diagram for the pixel circuit of FIG. 1A when operated in accordance with the FIG. 2 timing diagram.

Referring now to FIGS. 2, 3A and 3B, dark electrons are generated underneath the gate of the transfer transistor 110 in the region 350 next to the pinned photodiode photosensor 100. The inventor has determined that by applying a relatively small negative voltage to the gate of the transfer transistor 110 during the integration period 320, the concentration of holes 360 in the region underneath the transfer transistor gate increases (as shown in FIG. 3A). When this happens, dark electrons generated from the surface states under the transfer transistor 110 gate and/or from the bulk substrate of the pixel quickly recombine, leaving only a relatively small probability that the electrons will get captured by the photo-conversion device. Thus, dark current and the factors that cause dark current are substantially reduced.

Figure 1C:
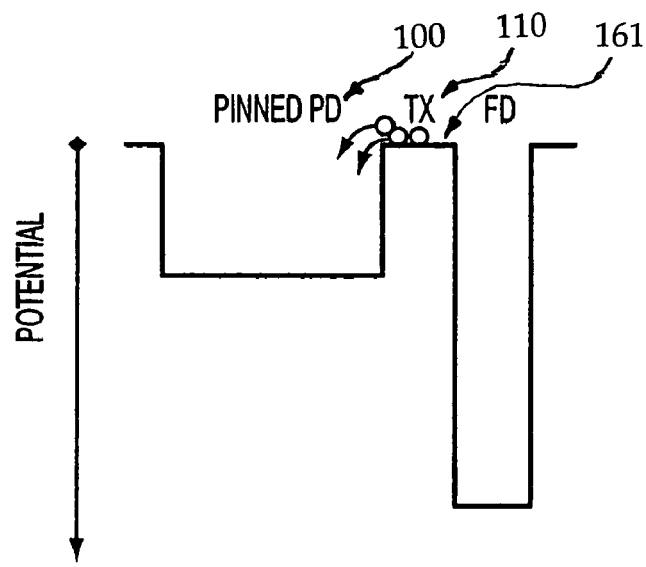
FIG. 1C illustrates a voltage potential diagram for the pixel circuit of FIG. 1A when operated in accordance with the FIG. 1B timing diagram.

The value of the small negative voltage depends on the threshold voltage of the transfer transistor, but a desired range for the voltage is from slightly less than 0V to a negative voltage with an absolute value higher than the absolute value of the threshold voltage of the transfer transistor. For a regular CMOS-imager process, the absolute value of the threshold voltage and lower limit of the voltage range corresponds to about (−0.8)V. The minimum negative voltage could be limited by electric static discharge (ESD) circuits in the real CMOS-imager design. In this and all other examples, the voltage on the gate of the transfer transistor 110 (FIG. 3A) is referenced to the substrate voltage. FIG. 3B illustrates how different voltages VTX effect the depletion region underneath the transfer transistor gate. That is, when the voltage VTX is set to 0V, the region underneath the transfer transistor is similar to the region depicted in FIG. 1C for the conventional pixel operation. When the voltage VTX is set to −0.3V, there is a depletion region 380 having a first slope underneath the transfer transistor. When the voltage VTX is set to −0.5V, there is a depletion region 390 having a second slope underneath the transfer transistor. The manner in which different positive transfer gate voltages VTX effect the reduction of dark current is described below with reference to FIG. 4B.

The inventor has also determined that the accumulation of the dark charges 300 can be substantially reduced by applying a plurality of positive voltage pulses to the gate of the transfer transistor 110 during the integration period 320. The application of the positive voltage pulses on the gate of the transfer transistor 110 creates a depletion region 330 underneath the transfer transistor (TX) gate. The depletion region 330 serves as a path for the dark electrons 300 to reach the floating diffusion region FD, as shown in FIG. 3A. Due to the difference in potentials between the photodiode photo-conversion device 100 and the floating diffusion region FD, the dark carriers 300 flow to the floating diffusion region FD and are drained away during a subsequent reset operation instead of being captured by the photo-conversion device 100.

The value of the positive voltage pulses depends on the threshold voltage of the transfer transistor 110, but a desired range for the voltage is from slightly greater than 0V to a voltage greater than a threshold voltage of the transfer transistor 110. For a regular CMOS-imager process, the threshold voltage and upper limit of the voltage range corresponds to about 0.8V. The maximum positive voltage could be limited by ESD circuits in the real CMOS-imager design. FIG. 4B illustrates how different voltages VTX effect the depletion region underneath the transfer transistor 110 gate. That is, when the voltage VTX is set to 0V, the region underneath the transfer transistor is similar to the region depicted in FIG. 1C for the conventional pixel operation. When the voltage VTX is set to 0.3V, there is a depletion region 330 having a first slope underneath the transfer transistor 110. When the voltage VTX is set to 0.5V, there is a depletion region 330 having a second slope underneath the transfer transistor 110.

Figure 4A:
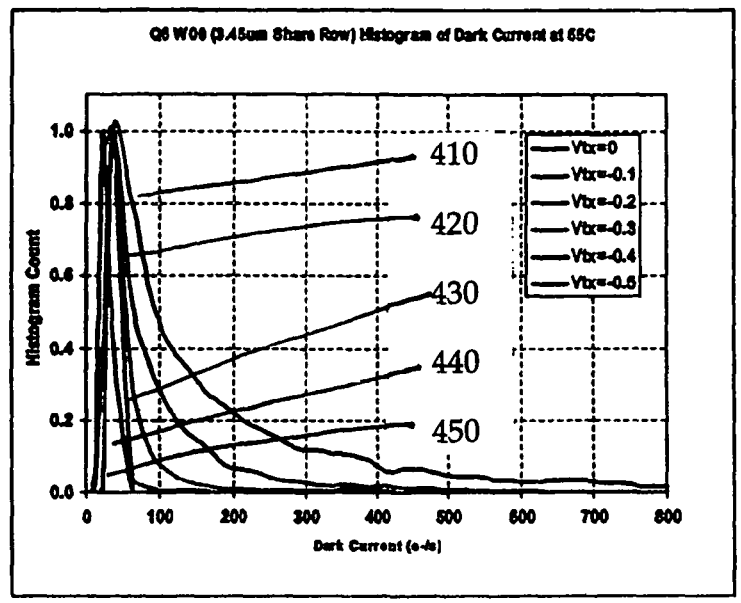
FIGS. 4A-4B are histograms comparing how negative voltage and positive voltage, respectively, reduce dark current in an experimental pixel.
Figure 4B:
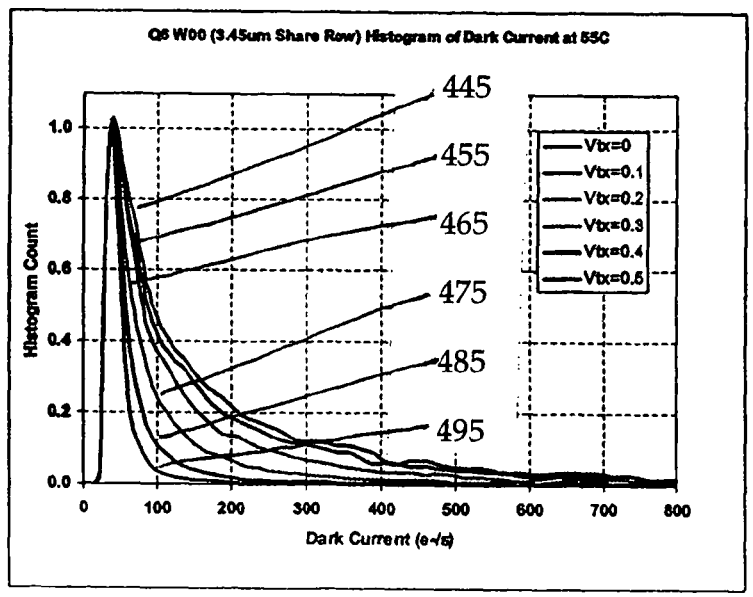

FIGS. 4A-4B are histograms illustrating how the invention reduced dark current in an experiment. FIG. 4A is a histogram showing dark current across the test pixel array when no voltage and small negative voltages are applied to the transfer transistor gate. Curve 410 represents the dark current when no voltage is applied to the transfer transistor gate. Curves 420, 430, 440, and 450 represent the dark current when −0.1, −0.2, −0.3, −0.5 volts, respectively, are applied to the transfer transistor gate.

FIG. 4B is a histogram showing dark current across the test pixel array when no voltage and small positive voltages are applied to the transfer transistor gate. Curve 445 represents the dark current when no voltage is applied to the transfer transistor gate. Curves 455, 465, 475, 485, and 495 represent the dark current when 0.1, 0.2, 0.3, 0.4, 0.5 volts, respectively, are applied to the transfer transistor gate.

Figure 5:
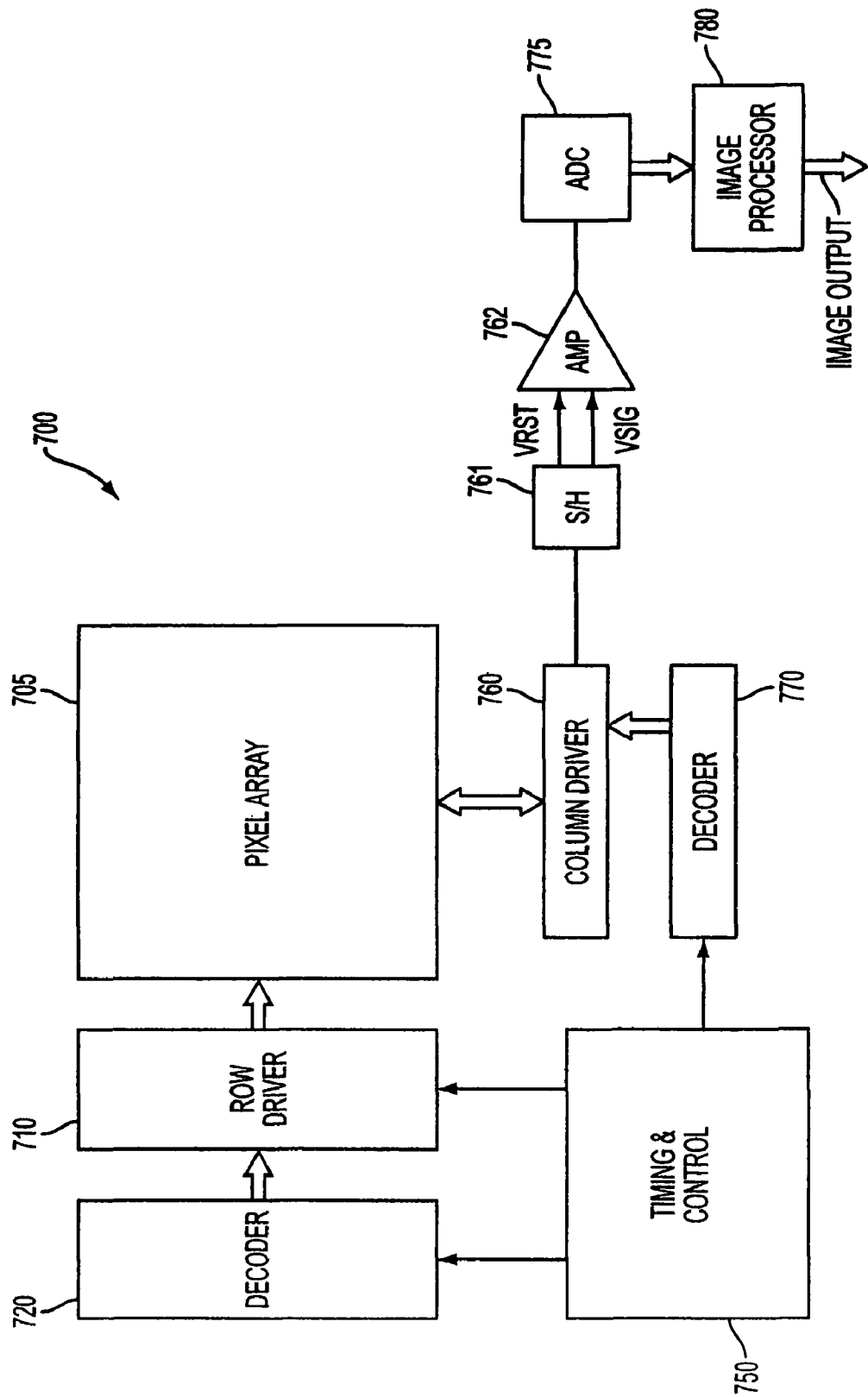
FIG. 5 shows an imager constructed in accordance with an embodiment of the invention.

FIG. 5 illustrates an exemplary imager 700 that may utilize any embodiment of the invention. The Imager 700 has a pixel array 705 comprising pixels constructed as described above with respect to FIG. 1A, or using other pixel architectures. Row lines are selectively activated by a row driver 710 in response to row address decoder 720. A column driver 760 and column address decoder 770 are also included in the imager 700. The imager 700 is operated by the timing and control circuit 750, which controls the address decoders 720, 770. The control circuit 750 applies the negative polarity voltage and the plurality of positive polarity voltage pulses to the control gate during the integration period. The control circuit 750 also controls the row and column driver circuitry 710, 760 in accordance with an embodiment of the invention (i.e., FIG. 2).

A sample and hold circuit 761 associated with the column driver 760 reads a pixel reset signal Vrst and a pixel image signal Vsig for selected pixels. A differential signal (Vrst−Vsig) is amplified by differential amplifier 762 for each pixel and is digitized by analog-to-digital converter 775 (ADC). The analog-to-digital converter 775 supplies the digitized pixel signals to an image processor 780 which forms a digital image.

Figure 6:
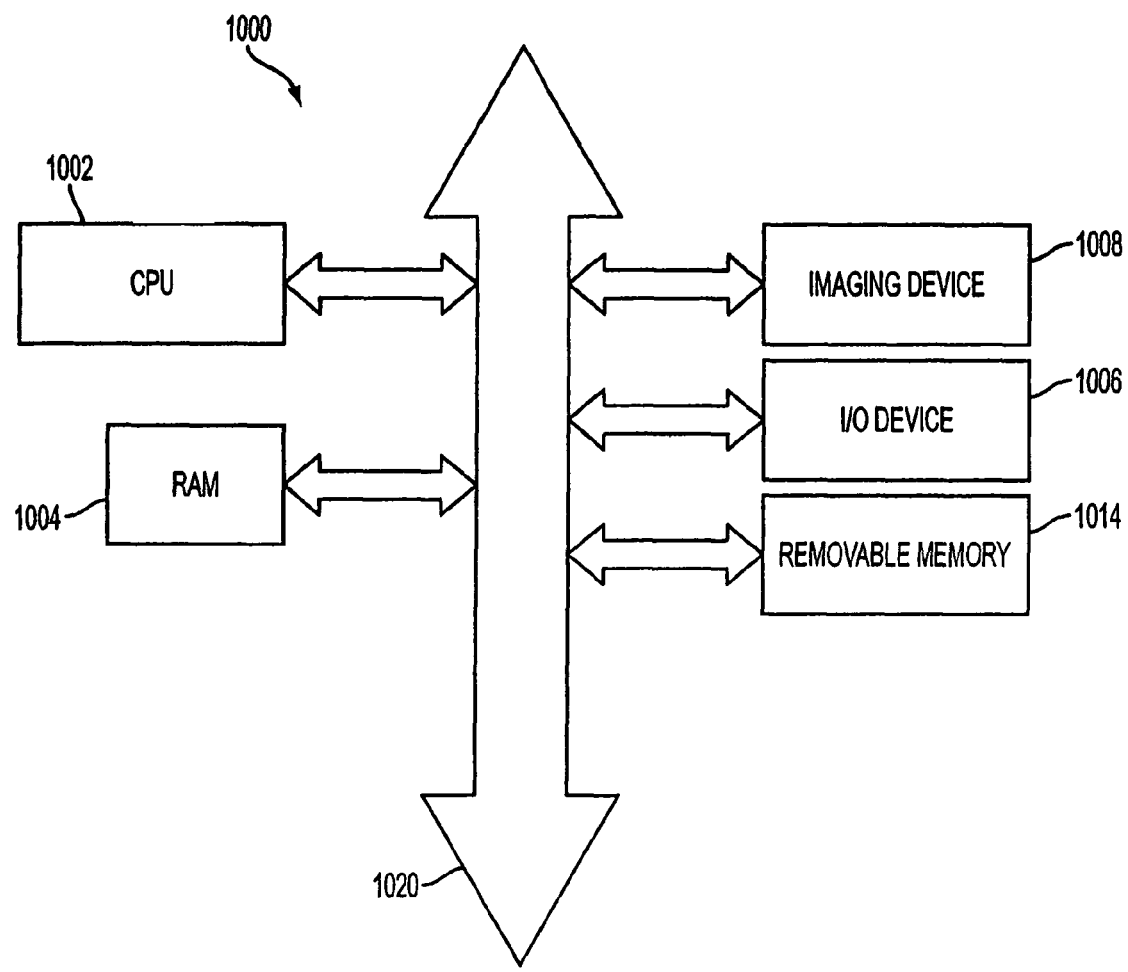
FIG. 6 shows a processor system incorporating at least one imager constructed in accordance with an embodiment of the invention.

FIG. 6 shows a system 1000, a typical processor system modified to include an imaging device 1008 (such as the imaging device 700 illustrated in FIG. 7) of the invention. The processor system 1000 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system, and other systems employing an imager.

System 1000, for example a camera system, generally comprises a central processing unit (CPU) 1002, such as a microprocessor, that communicates with an input/output (I/O) device 1006 over a bus 1020. Imaging device 1008 also communicates with the CPU 1002 over the bus 1020. The processor-based system 1000 also includes random access memory (RAM) 1004, and can include removable memory 1014, such as flash memory, which also communicate with the CPU 1002 over the bus 1020. The imaging device 1008 may be combined with a processor, such as a CPU, digital signal processor, or microprocessor, with or without memory storage on a single integrated circuit or on a different chip than the processor.

It should be noted that the invention has been described with reference to photo-conversion devices, but it should be appreciated that the invention may be utilized with any type of photosensor used in an imaging pixel circuit such as, but not limited to, photogates, photoconductors, photodiodes and pinned photodiodes and various configurations of photodiodes and pinned photodiodes.

It should also be appreciated that the small voltage does not need to be applied during the entire integration period. That is, the small voltage may be applied for only a portion of the charge integration period. Moreover, it should be appreciated that the plurality of voltage pulses do not need to be applied during the entire integration period. That is, the plurality of voltage pulses may be applied for only a portion of the charge integration period. It should also be appreciated that the imager of the invention could be designed to include all of the embodiments of the invention with a user selectable or application specific selectable option to determine which embodiment is performed during the operation of imager.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A pixel cell comprising:
    a photosensor;
    a storage region;
    a transistor for transferring photo-charges from said photosensor to said storage region; and
    a control circuit for applying a first polarity voltage to a control gate of said transistor during an integration period of said photosensor and for applying a plurality of pulses of a second polarity voltage to the control gate during the same integration period.

2. The pixel cell of claim 1, wherein the first polarity voltage is a negative voltage and the second polarity voltage is a positive voltage.

3. The pixel cell of claim 1, wherein the pixel cell is a 4T CMOS imager pixel cell.

4. The pixel cell of claim 1, wherein said storage region is source/drain region of said transfer transistor.

5. The pixel cell of claim 1, wherein said storage region is a floating diffusion region.

6. The pixel cell of claim 1, wherein said photosensor is a photodiode.

7. The pixel cell of claim 1, wherein said photosensor is a photogate.

8. The pixel cell of claim 1, wherein the second polarity voltage is greater than approximately 0.0 volts, but no more than approximately the threshold voltage of said transistor.

9. The pixel cell of claim 1, wherein the second polarity voltage is less than 0.8 volts.

10. The pixel cell of claim 1, wherein the first polarity voltage is less than approximately 0.0 volts, but has an absolute value no greater than the threshold voltage of said transistor.

11. The pixel cell of claim 1, wherein the first polarity voltage is applied during a portion of the integration period.

12. The pixel cell of claim 1, wherein the second polarity voltage is applied during a portion of the integration period.

13. The pixel cell of claim 10, wherein the first polarity voltage is less than 0 volts and greater than approximately −0.6 volts.

14. An imager circuit comprising:
    an array of pixel sensor cells formed in a substrate, each cell comprising:
        a photosensor;
        a storage region; and
        a transistor having a gate for transferring photo-charges from said photosensor of the pixel cell to said storage region; and
    a control circuit, connected to said array, for applying a first polarity voltage to said gate during a charge integration period and a plurality of pulses of a second polarity voltage to said gate during the same integration period.

15. The imager circuit of claim 14, wherein said first polarity voltage is a negative voltage and said second polarity voltage is a positive voltage.

16. The imager circuit of claim 14, wherein the second polarity voltage is greater than approximately 0.0 volts, but no more than approximately the threshold voltage of said transistor.

17. The imager circuit of claim 14, wherein the second polarity voltage is less than 0.8 volts.

18. The imager circuit of claim 14, wherein the first polarity voltage is less than approximately 0.0 volts, but has an absolute value no greater than the threshold voltage of said transistor.

19. The imager circuit of claim 14, wherein said storage region is a floating diffusion region.

20. The imager circuit of claim 14, wherein said photosensor is a photodiode.

21. The imager circuit of claim 18, wherein the first polarity voltage is less than 0 volts and greater than approximately −0.6 volts.

22. A processing system comprising:
    a processor; and
    an imaging device coupled to the processor, the imaging device including an array comprising a plurality of pixel sensor cells, each cell comprising:
        a photo-sensitive element for generating and accumulating photo-generated charges in response to applied light;
        a floating diffusion region;
        a transfer transistor having a gate for transferring said accumulated charges to said floating diffusion region; and
        a control circuit, connected to said array, for initially applying a first polarity voltage to the gate of said transfer transistor during an integration period and then a plurality of pulses of a second polarity voltage to the gate during the same integration period.

23. The processing system of claim 22, wherein the first polarity voltage is a negative voltage and the second polarity voltage is a positive voltage.

24. The processing system of claim 22, wherein the second polarity voltage is greater than approximately 0.0 volts, but no more than approximately the threshold voltage of said transistor.

25. The processing system of claim 22, wherein the second polarity voltage is less than 0.8 volts.

26. The processing system of claim 22, wherein the first polarity voltage is less than approximately 0.0 volts, but has an absolute value no greater than the threshold voltage of said transistor.

27. The processing system of claim 26, wherein the first polarity voltage is less than 0 volts and greater than approximately −0.6 volts.

* * * * *